United States Patent
Papasakellariou

(10) Patent No.: US 7,853,205 B2
(45) Date of Patent: Dec. 14, 2010

(54) METHODS FOR IMPROVING TRANSMISSION EFFICIENCY OF CONTROL CHANNELS IN COMMUNICATION SYSTEMS

(75) Inventor: Aris Papasakellariou, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 927 days.

(21) Appl. No.: 11/554,443

(22) Filed: Oct. 30, 2006

(65) Prior Publication Data

US 2007/0201350 A1 Aug. 30, 2007

Related U.S. Application Data

(60) Provisional application No. 60/732,868, filed on Nov. 2, 2005, provisional application No. 60/746,450, filed on May 4, 2006, provisional application No. 60/805,148, filed on Jun. 19, 2006.

(51) Int. Cl.
*H04B 7/165* (2006.01)
(52) U.S. Cl. .......................................... 455/23; 375/239
(58) Field of Classification Search ................ 375/260, 375/267, 148, 144; 370/329, 252; 455/23, 455/101, 102, 106
See application file for complete search history.

(56) References Cited

U.S. PATENT DOCUMENTS

| 7,103,325 | B1* | 9/2006 | Jia et al. | 455/101 |
|---|---|---|---|---|
| 2005/0107036 | A1* | 5/2005 | Song et al. | 455/23 |
| 2005/0128976 | A1* | 6/2005 | Uehara et al. | 370/329 |
| 2005/0238108 | A1* | 10/2005 | Suh et al. | 375/260 |
| 2006/0013328 | A1* | 1/2006 | Zhang et al. | 375/267 |
| 2006/0159195 | A1* | 7/2006 | Ionescu et al. | 375/267 |
| 2006/0193294 | A1* | 8/2006 | Jorswieck et al. | 370/334 |
| 2008/0192683 | A1* | 8/2008 | Han et al. | 370/329 |

\* cited by examiner

*Primary Examiner*—Tu X Nguyen
(74) *Attorney, Agent, or Firm*—Ronald O. Neerings; Wade James Brady, III; Frederick J. Telecky, Jr.

(57) ABSTRACT

Embodiments of the invention provide methods for optimizing the spectral efficiency of control channel transmissions carrying scheduling assignments from a serving Node B to user equipments. This is accomplished through the selection of the modulation and coding scheme with the highest spectral efficiency that can support transmission of a scheduling assignment to the corresponding user equipment with a reception performance satisfying a target error rate.

23 Claims, 6 Drawing Sheets

FIG. 2
*(PRIOR ART)*

← UNIT FOR FREQUENCY DOMAIN EQUALIZATION →

... | CP | DATA SYMBOLS | CP | DATA SYMBOLS | ...
         210  200   220        210   220

PREFIX LENGTH 315
OFDM SYMBOL 320
USEFUL OFDM SYMBOL DURATION 325

310 | 330 | 340

COPY 350

FIG. 4
*(PRIOR ART)*

FREQUENCY DIVERSITY 400

RECEIVED SIGNAL LEVEL vs FREQUENCY

MULTIUSER DIVERSITY 405
R402, R403, R401

RECEIVED SIGNAL LEVEL vs FREQUENCY

SUB-CARRIER SYMBOL → FREQUENCY

SUB-CARRIER SYMBOL → FREQUENCY
F402  F403  F401

UE
——— 401
- - - - 402
– – – 403

METHODS FOR IMPROVING TRANSMISSION EFFICIENCY OF CONTROL CHANNELS IN COMMUNICATION SYSTEMS

CROSS-REFERENCE TO RELATED APPLICATIONS

This application claims priority to and incorporates by reference United States Provisional Application Nos.: 60/732,868, filed Nov. 2, 2005; 60/746,450 filed May 4, 2006; and 60/805,148 filed Jun. 19, 2006.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Embodiments of the invention are directed, in general, to communication systems and, more specifically, to optimizing the spectral efficiency of the transmission of control channels in the downlink of a communication system.

The global market for both voice and data communication services continues to grow as does use of the systems which deliver such services. As communication systems evolve, system design has become increasingly demanding in relation to equipment and performance requirements. Future generations of communication systems, will be required to provide high quality high transmission rate data services in addition to high quality voice services. Orthogonal Frequency Division Multiplexing (OFDM) is a technique that will allow for high speed voice and data communication services.

Orthogonal Frequency Division Multiplexing (OFDM) is based on the well-known technique of Frequency Division Multiplexing (FDM). OFDM technique relies on the orthogonality properties of the fast Fourier transform (FFT) and the inverse fast Fourier transform (IFFT) to eliminate interference between carriers. At the transmitter, the precise setting of the carrier frequencies is performed by the IFFT. The data is encoded into constellation points by multiple (one for each carrier) constellation encoders. The complex values of the constellation encoder outputs are the inputs to the IFFT. For wireless transmission, the outputs of the IFFT are converted to an analog waveform, up-converted to a radio frequency, amplified, and transmitted. At the receiver, the reverse process is performed. The received signal (input signal) is amplified, down converted to a band suitable for analog to digital conversion, digitized, and processed by a FFT to recover the carriers. The multiple carriers are then demodulated in multiple constellation decoders (one for each carrier), recovering the original data. Since an IFFT is used to combine the carriers at the transmitter and a corresponding FFT is used to separate the carriers at the receiver, the process has potentially zero inter-carrier interference such as when the sub-carriers are separated in frequency by an amount larger than the maximum expected Doppler shift.

FIG. 1 is a diagram illustrative of the Frequency 103-Time 101 Representation 100 of an OFDM Signal. In FDM different streams of information are mapped onto separate parallel frequency channels 140. Each FDM channel is separated from the others by a frequency guard band to reduce interference between adjacent channels.

The OFDM technique differs from traditional FDM in the following interrelated ways:
1. multiple carriers (called sub-carriers 150) carry the information stream;
2. the sub-carriers 150 are orthogonal to each other; and
3. a Cyclic Prefix (CP) 110 (also known as guard interval) is added to each symbol 120 to combat the channel delay spread and avoid OFDM inter-symbol interference (ISI).

The data/information carried by each sub-carrier 150 may be user data of many forms, including text, voice, video, and the like. In addition, the data includes control data, a particular type of which is discussed below. As a result of the orthogonality, ideally each receiving element tuned to a given sub-carrier does not perceive any of the signals communicated at any other of the sub-carriers. Given this aspect, various benefits arise. For example, OFDM is able to use orthogonal sub-carriers and, as a result, thorough use is made of the overall OFDM spectrum. As another example, in many wireless systems, the same transmitted signal arrives at the receiver at different times having traveled different lengths due to reflections in the channel between the transmitter and receiver. Each different arrival of the same originally-transmitted signal is typically referred to as a multi-path. Typically, multi-paths interfere with one another, which is sometimes referred to as InterSymbol Interference (ISI) because each path includes transmitted data referred to as symbols. Nonetheless, the orthogonality implemented by OFDM with a CP considerably reduces or eliminates ISI and, as a result, a less complex receiver structure, such as one without an equalizer (one-tap "equalizer" is used), may be implemented in an OFDM system.

The Cyclic Prefix (CP) (also referred to as guard interval) is added to each symbol to combat the channel delay spread and avoid ISI. FIG. 2 is a diagram illustrative of using CP to eliminate ISI and perform frequency domain equalization. Blocks 200 each comprising cyclic prefix (CP) 210 coupled to data symbols 220 to perform frequency domain equalization. OFDM typically allows the application of simple, 1-tap, frequency domain equalization (FDE) through the use of a CP 210 at every FFT processing block 200 to suppress multi-path interference. Two blocks are shown for drawing convenience. CP 210 eliminates inter-data-block interference and multi-access interference using Frequency Division Multiple Access (FDMA).

Since orthogonality is typically guaranteed between overlapping sub-carriers and between consecutive OFDM symbols in the presence of time/frequency dispersive channels, the data symbol density in the time-frequency plane can be maximized and high data rates can be very efficiently achieved for high Signal-to-Interference and Noise Ratios (SINR).

FIG. 3 is a diagram illustrative of CP Insertion. A number of samples are typically inserted between useful OFDM symbols 320 (guard interval) to combat OFDM ISI induced by channel dispersion, assist receiver synchronization, and aid spectral shaping. The guard interval 310 is typically a prefix that is inserted 350 at the beginning of the useful OFDM symbol (OFDM symbol without the CP) 320. The CP duration 315 should be sufficient to cover most of the delay-spread energy of a radio channel impulse response. It should also be as small as possible since it represents overhead and reduces OFDM efficiency. Prefix 310 is generated using a last block of samples 340 from the useful OFDM symbol 330 and is therefore a cyclic extension to the OFDM symbol (cyclic prefix).

When the channel delay spread exceeds the CP duration 315, the energy contained in the ISI should be much smaller than the useful OFDM symbol energy and therefore, the OFDM symbol duration 325 should be much larger than the channel delay spread. However, the OFDM symbol duration 325 should be smaller than the minimum channel coherence time in order to maintain the OFDM ability to combat fast temporal fading. Otherwise, the channel may not always be constant over the OFDM symbol and this may result in inter-sub-carrier orthogonality loss in fast fading channels. Since the channel coherence time is inversely proportional to the maximum Doppler shift (time-frequency duality), this implies that the symbol duration should be much smaller than the inverse of the maximum Doppler shift.

The large number of OFDM sub-carriers makes the bandwidth of individual sub-carriers small relative to the total signal bandwidth. With an adequate number of sub-carriers, the inter-carrier spacing is much narrower than the channel coherence bandwidth. Since the channel coherence bandwidth is inversely proportional to the channel delay spread, the sub-carrier separation is generally designed to be much smaller that the inverse of the channel coherence time. Then, the fading on each sub-carrier appears flat in frequency and this enables 1-tap frequency equalization, use of high order modulation, and effective utilization of multiple transmitter and receiver antenna techniques such as Multiple Input/Multiple Output (MIMO). Therefore, OFDM effectively converts a frequency-selective channel into a parallel collection of frequency flat sub-channels and enables a very simple receiver. Moreover, in order to combat Doppler effects, the inter-carrier spacing should be much larger than the maximum Doppler shift.

FIG. 4 shows the concepts of frequency diversity 400 and multi-user diversity 405. Using link adaptation techniques based on the estimated dynamic channel properties, the OFDM transmitter can adapt the transmitted signal to each User Equipment (UE) to match channel conditions and approach the ideal capacity of frequency-selective channel. Thanks to such properties as flattened channel per sub-carrier, high-order modulation, orthogonal sub-carriers, and MIMO, it is possible to improve spectrum utilization and increase achievable peak data rate in OFDM system. Also, OFDM can provide scalability for various channel bandwidths (i.e. 1.25, 2.5, 5, 10, 20 MHz) without significantly increasing complexity.

OFDM may be combined with Frequency Division Multiple Access (FDMA) in an Orthogonal Frequency Division Multiple Access (OFDMA) system to allow multiplexing of multiple UEs over the available bandwidth. Because OFDMA assigns UEs to isolated frequency sub-carriers, intra-cell interference may be avoided and high data rate may be achieved. The base station (or Node B) scheduler assigns physical channels based on Channel Quality Indication (CQI) feedback information from the UEs, thus effectively controlling the multiple-access mechanism in the cell. For example, in FIG. 4, transmission to each of the three UEs 401, 402, 403 is scheduled at frequency sub-bands where the channel frequency response allows for higher SINR relative to other sub-bands. This is represented by the Received signal levels R401, R402, and R403 for users 401, 402 and 403 at Frequencies F401, F402, and F403 respectively.

OFDM can use frequency-dependent scheduling with optimal per sub-band Modulation & Coding Scheme (MCS) selection. For each UE and each Transmission Time Interval (TTI), the Node B scheduler selects for transmission with the appropriate MCS a group of the active UEs in the cell, according to some criteria that typically incorporate the achievable SINR per sub-band based on the CQI feedback. A UE may be assigned the same sub-band for transmission or reception of its data signal during the entire TTI. In addition, sub-carriers or group of sub-carriers may be reserved to transmit pilot, control signaling or other channels. Multiplexing may also be performed in the time dimension, as long as it occurs at the OFDM symbol rate or at a multiple of the symbol rate (i.e. from one TTI to the next). The MCS used for each sub-carrier or group of sub-carriers can also be changed at the corresponding rate, keeping the computational simplicity of the FFT-based implementation. This allows 2-dimensional time-frequency multiplexing, as shown in FIG. 5 and FIG. 6.

Turning now to FIG. 5, which is a diagram illustrative of a configuration for multi-user diversity. The minimum frequency sub-band used for frequency-dependent scheduling of a UE typically comprises several sub-carriers and may be referred to as a Resource Block (RB) 520. Reference number 520 is only pointing to one of the 8 RBs per OFDM symbol shown as example and for drawing clarity. RB 520 is shown with RB bandwidth 525 (typically comprising of a predetermined number of sub-carriers) in frequency dimension and time duration 510 (typically comprising of a predetermined number of OFDM symbols such as one TTI) in time dimension. Each RB may be comprised of continuous sub-carriers and thus be localized in nature to afford frequency-dependent scheduling (localized scheduling). A high data rate UE may use several RBs within same TTI 530. UE #1 is shown as an example of a high rate UE. Low data rate UEs requiring few time-frequency resources may be multiplexed within the same RB 540 or, alternatively, the RB size may be selected to be small enough to accommodate the lowest expected data rate.

Alternatively referring to FIG. 6, which is a diagram illustrative of a configuration for frequency diversity, an RB 620 may correspond to a number of sub-carriers substantially occupying the entire bandwidth thereby offering frequency diversity (distributed scheduling). This may be useful in situations where CQI feedback per RB is not available or it is unreliable (as is the case for high speed UEs) and only CQI over the entire frequency band is meaningful. Therefore, a sub-band (or RB) consists of a set of sub-carriers that may be either consecutive or dispersed over the entire spectrum. It should be noted, that another option to achieve frequency diversity is to assign to a UE two or more RBs with each RB comprising of contiguous sub-carriers but and with each RB occupying non-contiguous parts of the bandwidth. In such cases, an RB always consists of a contiguous set of sub-carriers (for both localized and distributed scheduling).

By assigning transmission to various simultaneously scheduled UEs in different RBs, the Node B scheduler can provide intra-cell orthogonality among the various transmitted signals. Moreover, for each individual signal, the presence of the cyclic prefix provides protection from multipath propagation and maintains in this manner the signal orthogonality.

Each scheduled UE is informed of its scheduling assignment by the serving Node B through the downlink (DL) control channel. This control channel typically carries the scheduled UE identities (IDs), RB assignment information, the MCS used to transmit the data, the transport block size, and hybrid ARQ (HARQ) information relating to possible data packet re-transmissions in case of a previous erroneous reception for the same data packet. The control channel may also optionally carry additional information such as for the support of a multi-input multi-output (MIMO) scheme for transmission and reception with multiple antennas. A scheduling assignment may relate either to data transmission from the Node B to a UE (DL of a communication system) or to data transmission from a UE to the Node B (UL of a communication system).

According to one prior art method for the control channel transmission, such as the one employed by the WiMax communication system, the control channel information for all scheduled UEs is jointly coded with a known MCS. This MCS has to be a low one in terms of spectral efficiency (for example, QPSK modulation and low rate convolutional or turbo coding with possible repetitions) as the control channel needs to be received by all UEs in the serving Node B area including ones potentially experiencing very low SINR. As a result, the control channel size and corresponding overhead may become excessively large, thereby adversely affecting the system throughput.

According to another prior art method for the control channel transmission, the control channel information for all scheduled UEs is separately coded with a known fixed MCS and power control may be applied to the transmission. In this manner, the control channel transmission power for UEs located closer to the serving Node B is reduced while the transmission power for UEs located near the edge is increased to account for the path loss. This scheme improves the overall spectral efficiency by reducing the interference caused by the control channel transmission. Nevertheless, as power control adaptation is based on prior CQI feedback from UEs, it is not generally possible to predict the future interference conditions in order for the power control to be effective. Moreover, this transmission method may result to significant and unpredictable interference variations making the whole scheduling process less reliable. For example, a conflict occurs when the control channels to cell edge UEs in adjacent Node Bs are transmitted from these Node Bs using substantially the same frequency resources. Then, transmission power control is ineffective as it is substantially cancelled since the interfering transmissions apply the same transmission power control. Separate transmission of the control channel to scheduled UEs with a fixed MCS is used in the 3GPP HSDPA communication system.

Thus, there is a need for a method to provide reliable transmission of the DL control channel while optimizing the corresponding spectral efficiency of the transmission in a communication system.

SUMMARY

Embodiments of the invention provide methods for robust control channel transmission with optimum spectral efficiency in the downlink (DL) of a communication system. Based on explicit or implicit channel quality indicator (CQI) feedback from user equipments (UEs) and the estimated path loss, a serving base station (Node B) transmits the control channel to a scheduled UE using a modulation and coding scheme (MCS) substantially determined from the CQI feedback for said UE. This CQI feedback may be explicit for the communication in the DL channel or implicit through the transmission, for example, of a reference signal for the communication in the uplink (UL) channel. The spectral efficiency of the corresponding control channel transmission is optimized by having the Node B select the appropriate MCS based on the CQI estimate from scheduled UEs.

As the number of DL and UL scheduled UEs may vary during consecutive transmission time intervals (TTIs), and the corresponding control channels may be potentially transmitted with different MCS, the size of the total control channel may also vary. The Node B communicates the number of DL and UL scheduling assignments in each MCS region, belonging to a predetermined set of MCS regions, through a field that is separately transmitted prior to the remaining part of the control channel carrying the DL and UL scheduling assignments. Alternatively, the Node B may communicate the size of the control channel in each of the MCS regions. This field has a fixed and pre-determined size and MCS and should be received at least by all DL and UL UEs having scheduling assignments and potentially by all UEs communicating with the reference Node B regardless if they receive a scheduling assignment during the reference TTI. Then, each UE can know of the size of the control channel and, for a pre-determined form of transmission of the control channel codewords in the various MCS regions (for example, control channel codewords in the lowest MCS region are transmitted first in predetermined time-frequency resources, followed by the codewords in the second lowest MCS region, and so on) the UE can know of the MCS region where its control channel codeword is transmitted. Since all scheduled UEs can know the control channel size, no time-frequency resources are wasted for transmission of DL data packets since all of the remaining resources can be utilized for data transmission without additional signaling, thereby effectively additionally improving the spectral efficiency of the control channel transmission.

These and other features and advantages will be more clearly understood from the following detailed description taken in conjunction with the accompanying drawings and claims.

BRIEF DESCRIPTION OF THE DRAWINGS

For a more complete understanding of the disclosure and the advantages thereof, reference is now made to the following brief description, taken in connection with the accompanying drawings and detailed description, wherein like reference numerals represent like parts.

FIG. 2 is a diagram illustrative of using cyclic prefix (CP) to eliminate ISI and perform frequency domain equalization;

FIG. 3 is a diagram illustrative of Cyclic Prefix (CP) Insertion

FIG. 4 shows the concepts of frequency and multi-user diversity;

DETAILED DESCRIPTION

Figure 1:
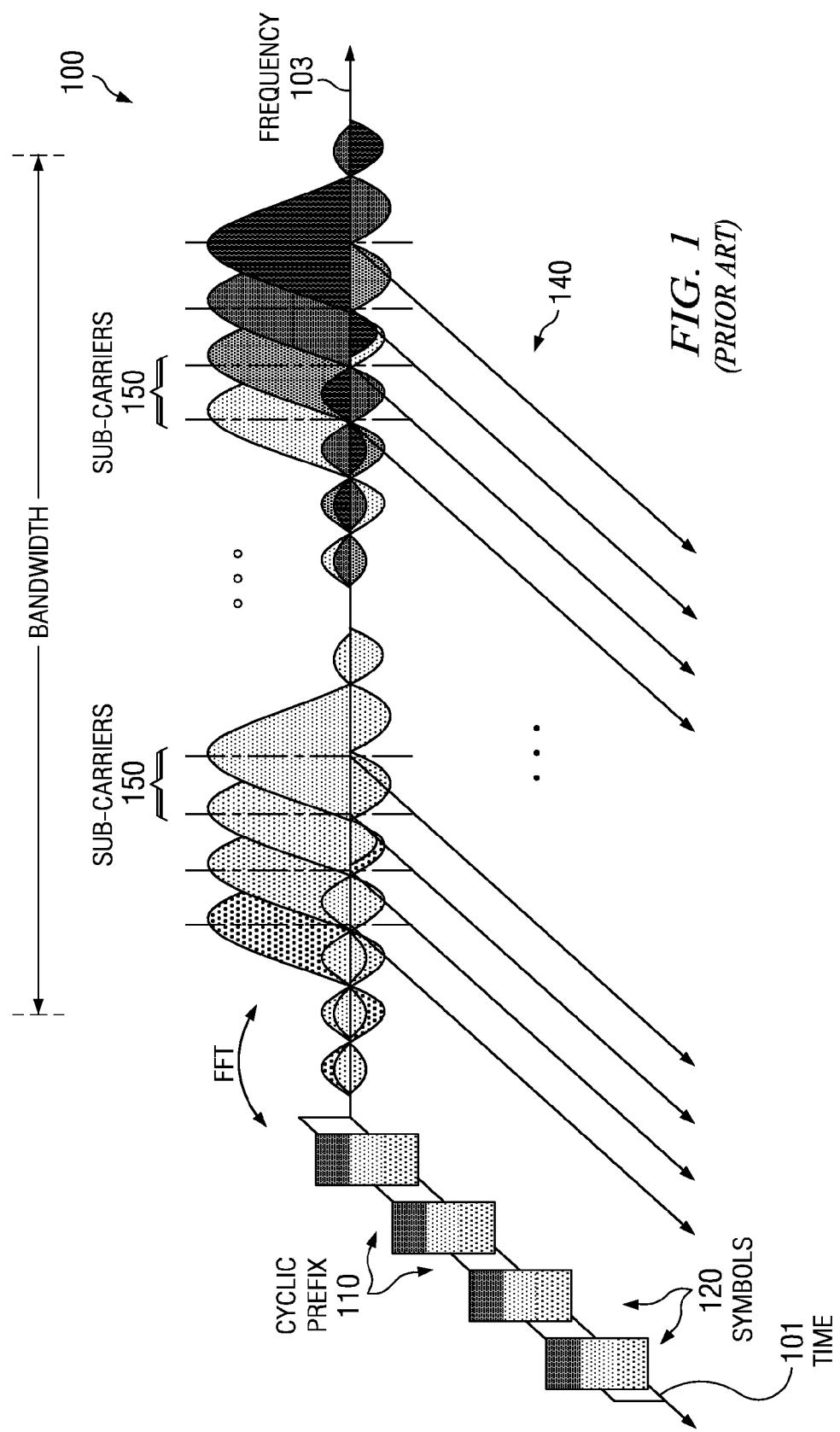
FIG. 1 is a diagram illustrative of the Frequency-Time Representation of an OFDM Signal.
Figure 5:
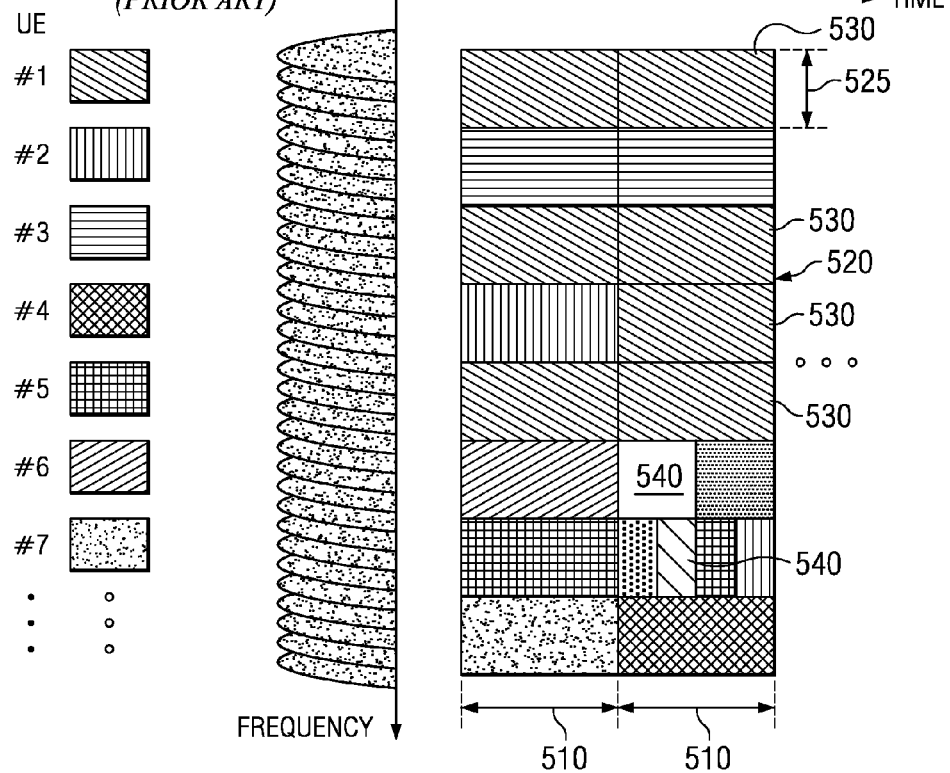
FIG. 5 is a diagram illustrative of a configuration for Multi-User Diversity.
Figure 6:
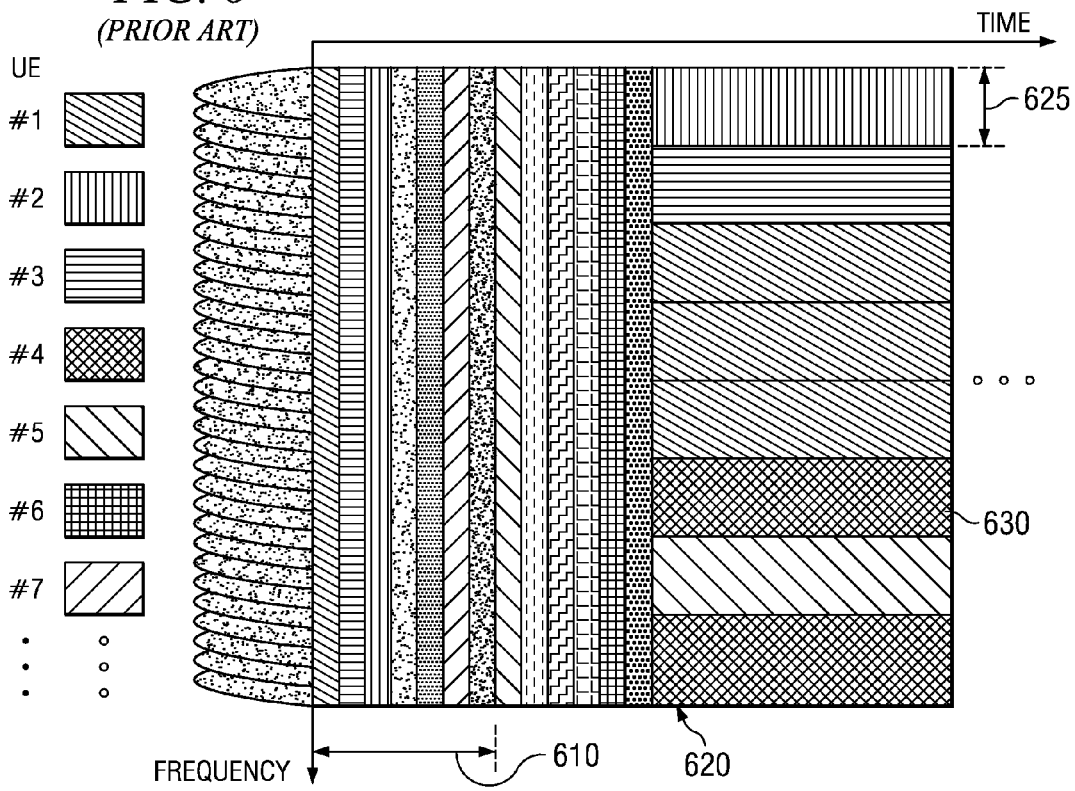
FIG. 6 is a diagram illustrative of a configuration for frequency diversity.

It should be understood at the outset that although an exemplary implementation of one embodiment of the disclosure is illustrated below, the system may be implemented using any number of techniques, whether currently known or in existence. The disclosure should in no way be limited to the exemplary implementations, drawings, and techniques illustrated below, including the exemplary design and implementation illustrated and described herein, but may be modified within the scope of the appended claims along with their full scope of equivalents.

Embodiments of the invention address the problem of spectrally efficient control signaling design for scheduling of downlink (DL) and uplink (UL) data packet transmissions in OFDMA-based networks, including variants of the OFDMA transmission method such as the single-carrier FDMA (SC-FDMA) transmission method. The DL of a communication system refers to the communication from a serving base station (also commonly referred to as Node B) to one or more UEs and the UL refers to the communication from one or more UEs to a serving Node B. The control channel is transmitted in the DL (from the Node B to the scheduled UEs).

The DL control channel, also referred to as DL shared control channel (SCCH), is a major part of the DL overhead (in addition to reference signals and other synchronization or broadcast channels) that directly impacts the achievable throughput and peak data rates. Minimization of this overhead requires corresponding minimization of the corresponding signaling bits and optimization for the spectral efficiency of the SCCH transmission. While only minor improvements are possible for the former, mainly through efficient mapping techniques for the scheduled UE identities (IDs) and frequency resource block (RB) allocations, the latter requires careful transmission design.

In the following discussion, a field indicating the SCCH size and the number of DL and UL scheduled UEs is referred to as SCCH Category 0 (or Cat0). This field does not carry any information relating to DL or UL scheduling assignments. Rather, its purpose is to dimension the control channel so that UEs know how to decode the remaining SCCH that carries the scheduling related information. The SCCH part carrying the scheduled UE IDs and allocated RB position for each scheduled UE is referred to SCCH Category 1 (or Cat1). The remaining SCCH part is referred to as Category 2 (or Cat2). Cat2 carries information related to the modulation and coding scheme (MCS) applied to the data transmission, the transport format, hybrid ARQ (HARQ) information relating to possible data packet retransmissions and possibly additional information such as for the multi-input multi-output (MIMO) scheme applied to data transmission.

This invention describes an SCCH structure involving Cat0 and the remaining SCCH (carrying scheduling assignment information). This invention also describes a transmission method targeting the spectral efficiency optimization for the remaining SCCH transmission. For the DL scheduling assignments (or scheduling grants), Cat2 may be transmitted either separately to Cat1 in RBs assigned to DL data transmission or together with Cat1 (in a single codeword as known in prior art). Clearly, only joint transmission of Cat1 and Cat2 is possible for UL scheduling assignments as there are no corresponding RBs in which data transmission follows in the DL (unless a UE has simultaneous DL and UL scheduling assignments). For ease of reference, the remaining SCCH (other than Cat0), will be referred to as Cat1, particularly in some Figures. It is not relevant to the invention whether Cat2 for DL assignments, as described in the previous paragraph, is transmitted together or separately to Cat1.

Figure 8:
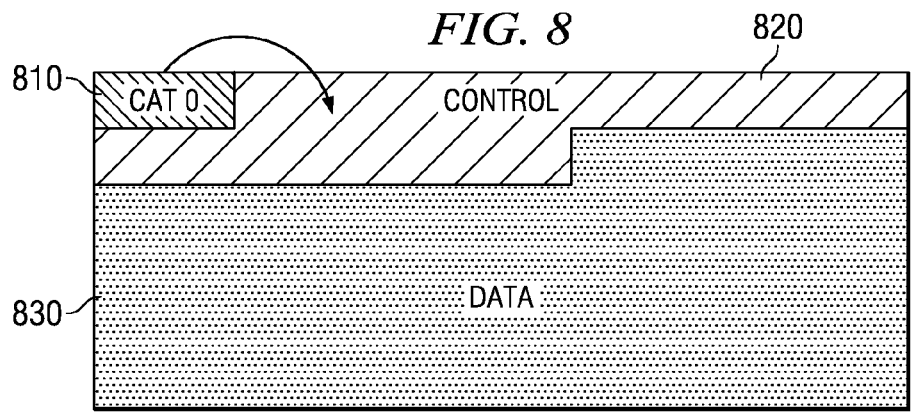
FIG. 8 shows an exemplary partitioning of the downlink transmission time interval (TTI) illustrating the transmission of the control channel Category 0, the remaining control channel, and the data channel.

FIG. 8 shows an exemplary partition for Cat0 810 and the remaining SCCH 820. As it was previously mentioned, Cat0 has a predetermined size and transmitted with an MCS that is known to all UEs. It specifies the size of the remaining SCCH. It is not necessary that Cat0 is transmitted in contiguous sub-carriers before the remaining SCCH and in practice the sub-carriers carrying the two may be multiplexed to provide frequency diversity. The remaining time-frequency resources can be assumed to be allocated to data 830, or other channels such as the reference signal channel, the synchronization channel, and the broadcast channel.

Figure 9:
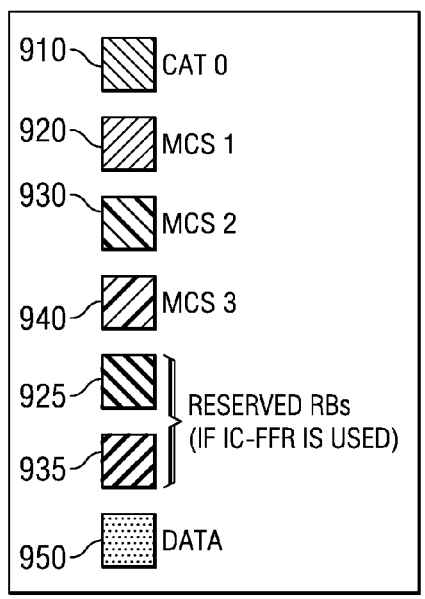
FIG. 9 shows an exemplary transmission of the control channel Category 0, and of the remaining control channel in various modulation and coding scheme (MCS) regions. Time division multiplexing (TDM) is assumed between the control and data channels.
Figure 9:
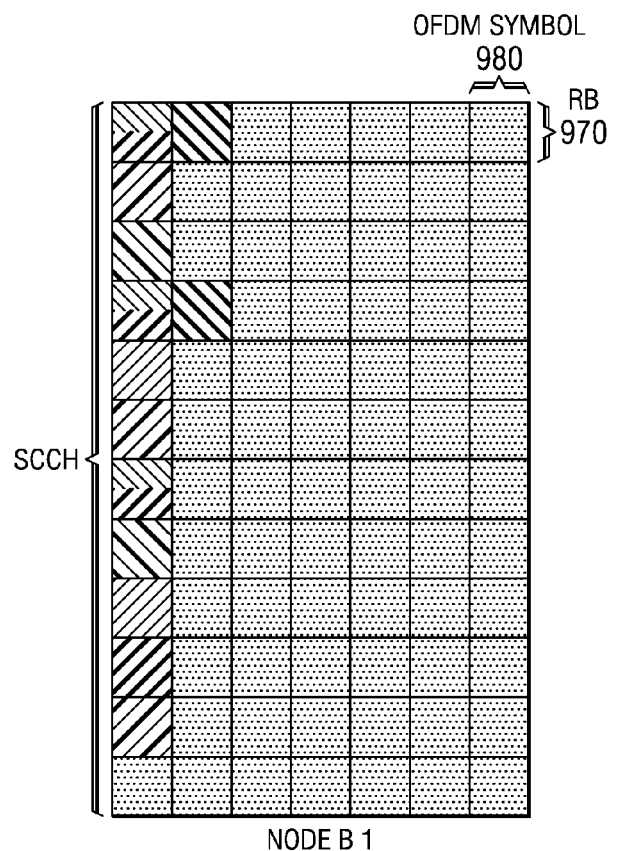
Figure 9:
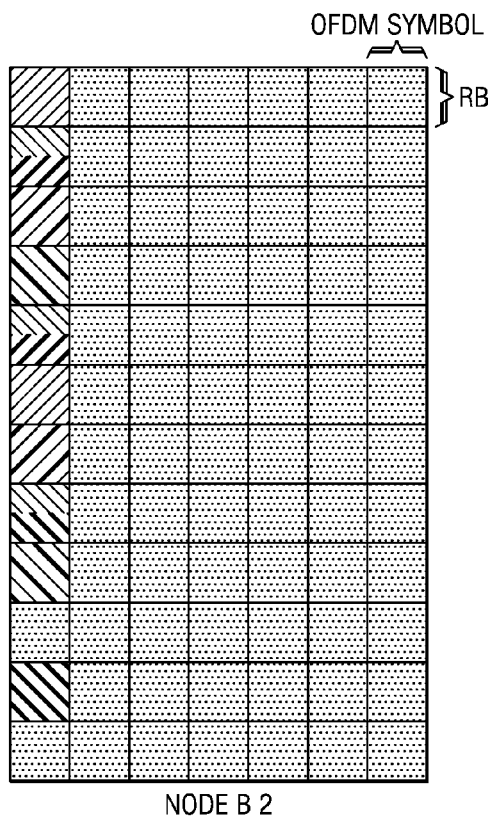
Figure 9:
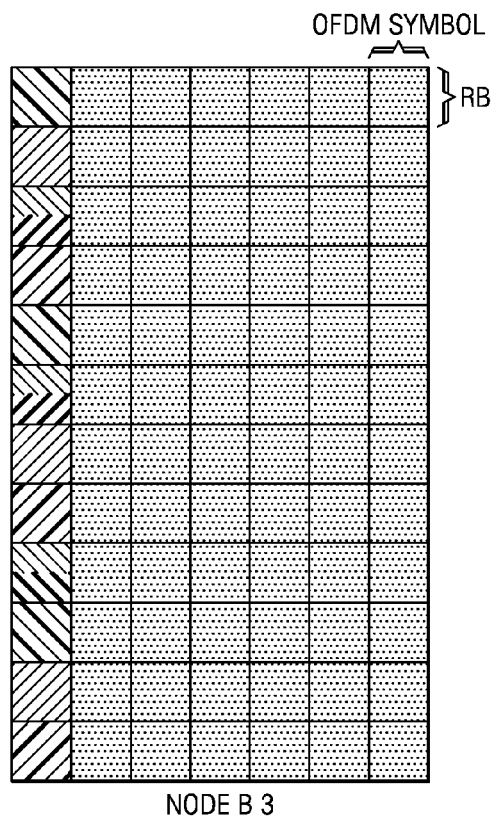
Figure 10:
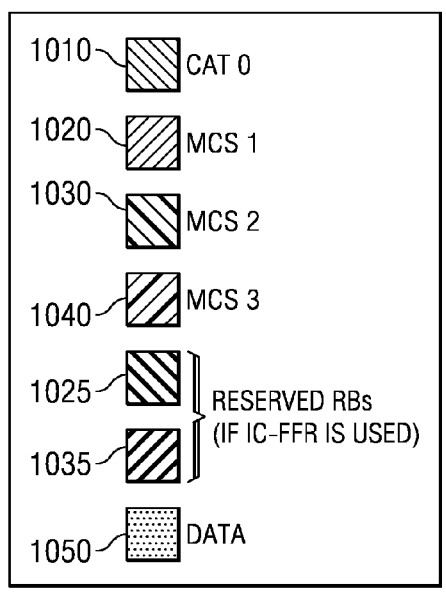
FIG. 10 shows an exemplary transmission of the control channel Category 0, and of the remaining control channel in various modulation and coding scheme (MCS) regions. Frequency division multiplexing (FDM) is assumed between the control and data channels.
Figure 10:
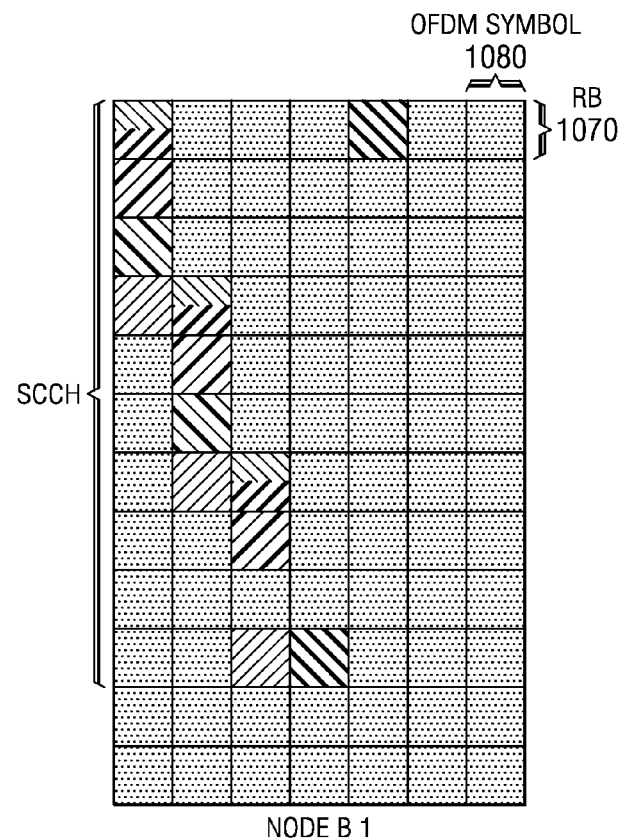
Figure 10:
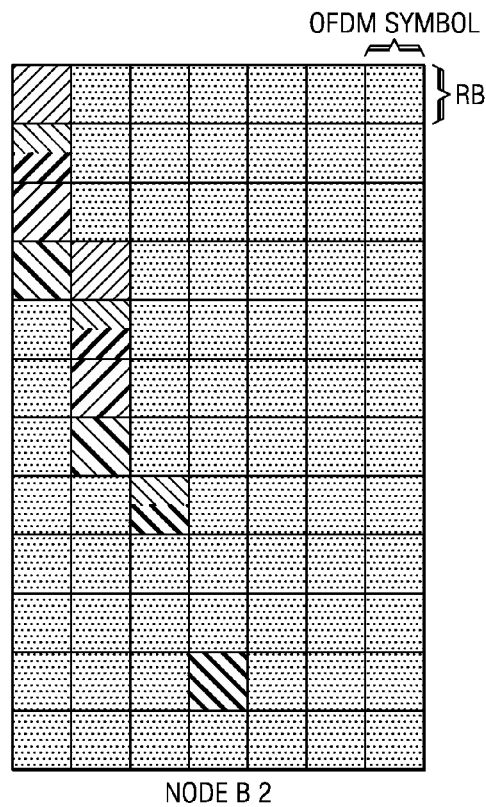
Figure 10:
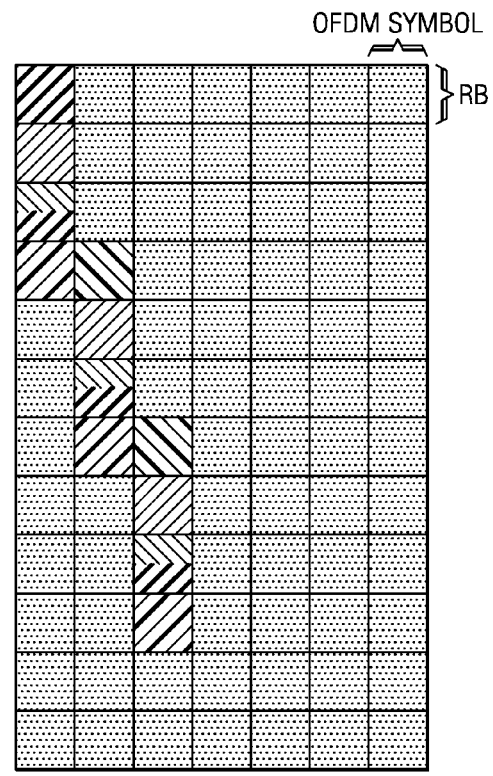

FIG. 9 and FIG. 10 show an exemplary structure for SCCH Cat0 and Cat1 (remaining SCCH) further illustrating the embodiments of the invention. Time Division Multiplexing (TDM) of the control and data channels is assumed in FIG. 9. Frequency Division Multiplexing (FDM) is assumed in FIG. 10. In the following, we refer to the TDM option but the same descriptions and arguments also apply for the FDM one.

Cat0 910 informs the UEs of the remaining SCCH size, thereby limiting the waste of resources associated with having a fixed SCCH size which may not always be filled. The exemplary SCCH granularity in FIG. 9 is one RB 970 in one OFDM symbol 980 but it can generally be any number of sub-carriers, including one sub-carrier, or even one OFDM symbol. Obviously, the smallest granularity in an MCS region is specified by the minimum number of resources (typically RBs) required for the transmission of a single DL or UL scheduling assignment, whichever is smaller. Larger granularities than the minimum one may also be used and may extent to half or even one OFDM symbol. In such cases, the SCCH size specified by Cat0 in an MCS region implies that the each of the numbers for the corresponding DL and UL scheduling assignments is above the ones for the next lower possible SSCH size, if any, and equal to or smaller than the ones for the specified SSCH size.

The control channel (scheduling assignment) corresponding to a scheduled UE is transmitted with a MCS determined by the SINR that will be experienced by the transmission to that UE. The serving Node B can determine this SINR either based on the DL CQI reported by each UE having a DL scheduling assignment, or implicitly based on the UL CQI the serving Node B determines for each UE having an UL scheduling assignment. The larger the SINR, the higher the MCS in terms of spectral efficiency. As the exemplary embodiment considers that the control channel transmission from the serving Node B to each scheduled UE is distributed in frequency, the MCS region may be determined based on the average SINR and not the individual SINR in each RB. Three MCS regions 920, 930, and 940 are considered (as an example) in FIG. 9 (the same applies in FIG. 10) and the remaining RBs in the OFDM symbols of a TTI are allocated to data 950 and other channels, such as for reference signals (not shown). Reference signals may also occupy OFDM symbols where the control channel is transmitted. In general, more than three MCS regions may be used as shown for example in Table 1, shown below. Repetition coding of one MCS results into a different MCS (with spectral efficiency that is inversely proportional to the repetition factor).

TABLE 1

| MCS 7 | 16QAM, R = $2/3$ |
|---|---|
| MCS 6 | 16QAM, R = $1/2$ |
| MCS 5 | 16QAM, R = $1/3$ |
| MCS 4 | QPSK, R = $1/2$ |

TABLE 1-continued

| MCS 3 | QPSK, R = ⅓ |
| MCS 2 | QPSK, R = ¼ |
| MCS 1 | QPSK, R = ⅓, 2 × repetition |
| MCS 0 | QPSK, R = ¼, 2 × repetition |

Figure 7:
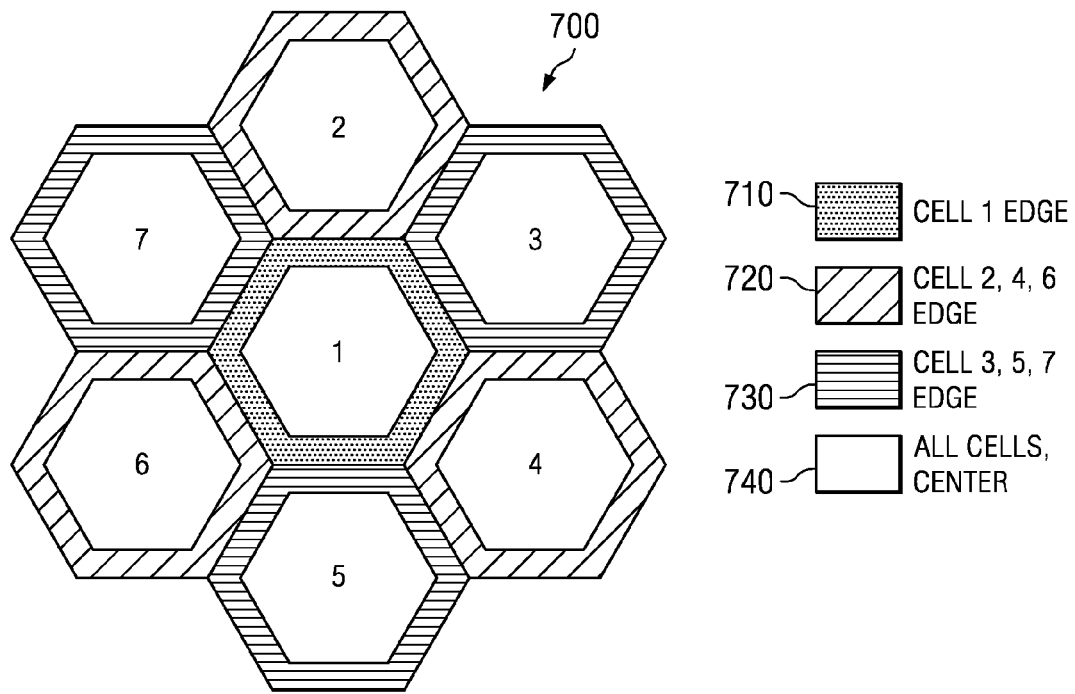
FIG. 7 shows an exemplary cell structure highlighting the cell edges where reserved resource blocks are used for transmission by each Node B through application of interference co-ordination through fractional frequency re-use.

The lowest MCS region 925 in terms of spectral efficiency (or additionally the next lower MCS region(s) 935 if possible in terms of available resources) may be associated with reserved RBs for use at the cell edge through the application of cell edge interference co-ordination through fractional frequency reuse (IC-FFR), embodiments of which are described in co-pending U.S. application Ser. No. 11/535,867. With IC-FFR, certain RBs in a reference Node B are reserved to be protected by interference from interfering (adjacent) Node Bs by imposing the restriction that the interfering Node Bs do not transmit with full power in the RBs reserved by the referenced Node B (FIG. 7). In the example of FIG. 7, cell 1 is allocated one-third of that spectrum 710, cells 2, 4, and 6 are allocated a second one-third 720, and cells 3, 5, and 7 are allocated the final one-third 730. When the Node B scheduler of any of the previous cells schedules a set of UEs for transmission, it may assign, for example, the one-third of these scheduled UEs it determines to be located closer to the cell edge (than the remaining two-thirds of UEs) in the one-third of reserved RBs this reference Node B has been allocated. The remaining two-thirds of scheduled UEs, deemed to be located closer to the cell interior, are scheduled in the remaining two-thirds of the available spectrum. With IC-FFR, the low SINR values of the geometry CDF are improved and no repetition coding may be necessary, thereby improving spectral efficiency and avoiding unnecessary increase of the SCCH size and the corresponding overhead.

As an alternative to IC-FFR, fractional time re-use (IC-FTR) may be used for synchronous networks. Embodiments of IC-FTR are described in co-pending U.S. application Ser. No. 11/535,867. With IC-FTR, the entire frequency bandwidth is always used and the division of resources occurs in time. Cell edge UEs having a reference serving Node B are scheduled only during specific TTIs. For the control channel transmission, the number of MCS regions per TTI can be reduced while achieving the gains from link adaptation. This is because only a subset of MCS regions may be needed during TTIs that cell edge UEs are not scheduled. Another important side benefit is that cell edge UEs need to monitor the control channel only during TTIs where scheduling is possible, thereby enabling such UEs, for which battery savings are most important, to go into a sleep mode in the remaining TTIs. To enable this sleep mode, cell-edge UEs may be classified and informed of the TTIs where scheduling is possible through low rate signaling of the corresponding time scheduling pattern (in the order of tens of seconds—FTR reconfiguration period).

Transmission of the control near the beginning of the TTI (for example, within the first 3-4 OFDM symbols of a 14-symbol TTI) can enable the so-called "micro-sleep" operation for the UE. With micro-sleep, if the UE determines it is not scheduled during a TTI, it may shut down parts of its transmitter and receiver chain for the remaining of the TTI and turn them back on again in time to receive the control channel of the next TTI. This enables the UE to conserve battery power. However, when the UE goes into "micro-sleep" it may miss some of the reference signals (RS) that are significant for improved channel estimation and demodulation performance of subsequent channels, such as the control channel in the next TTI. However, this channel estimation loss depends on the propagation characteristics the channel medium introduces to the transmitted signal prior to its reception by the reference UE. The larger the frequency selectivity of the channel medium, the larger the channel estimation loss from reducing the number of RS. Therefore, the UE may perform micro-sleep only when it determines that the channel medium is not very frequency selective (nearly flat channel) as in such cases channel estimation performance is very accurate even with a reduced set of possible RS. Also, as RS time interpolation to previous TTIs is possible for low UE speeds, the UE may perform micro-sleep if it estimates a low Doppler shift implying a low UE speed for a given operating carrier frequency.

The main embodiment of this invention, that is further described in the remaining of this application, can be summarized as follows:

The control channel codeword carrying the scheduling assignment information for each DL or UL scheduled UE is transmitted with an MCS corresponding to the SINR conditions of the referenced UE as determined by the serving Node B. As the SINR conditions experienced by UEs in the serving area of a Node B may have significant variations, multiple MCS regions are used to capture the SINR conditions. The larger the number of MCS regions, the smaller the granularity of the SINR range captured by each MCS region. The MCS regions are predetermined.

A field referred to as Cat0 is transmitted by the serving Node B and should be designed so that it is received by all UEs with a desired reliability. Cat0 implicitly or explicitly informs the size of the remaining control channel in each MCS region. Cat0 is transmitted by the serving Node B with a predetermined MCS and a predetermined size and both are known in advance by all UEs. The MCS regions are predetermined.

Additional attributes of the SCCH transmission (including Cat0) are outlined as follows:
 a) Puncturing and repetition may be used to fit Cat0 or the remaining SCCH into an integer number of RBs (or, in general for the remaining SCCH, into a multiple of the minimum number of resources required for the transmission of a control channel codeword for DL or UL scheduling assignments in each MCS region).
 b) The number of RBs for each MCS region directly depends on the number of DL and UL scheduled UEs having their SCCH (other than Cat0) transmitted in that MCS region.
 c) With application of IC-FFR, at least one or more RBs are reserved in each cell for protection from inter-cell interference. The position of the first reserved RB can be a function of the cell ID or it can be signaled in the synchronization channel (SCH) or in the broadcast channel (BCH). Two signaled bits are required for an effective soft frequency re-use factor of 3 with IC-FFR. SCCH transmission (including Cat0) to cell edge UEs is carried through the reserved RBs that are protected from most of the inter-cell interference.
 d) With IC-FFR, the relative position of the MCS regions can be specified relative to the one of the reserved RBs. Alternatively, without IC-FFR, the relative position of the MCS regions may depend on the order of these regions. For example, the first RB in FIG. 8 may be occupied by the lowest (UE populated) MCS region, the second RB may be occupied by the next lower MCS region and so on. The MCS regions may be ranked in accordance to their spectral efficiency. For example, an MCS employing QPSK modulation and code rate of 1/3 has a lower rank than an MCS region employing QAM16 modulation and code rate 1/3.

e) Frequency hopping (FH) is applied to RBs (or sub-carriers) carrying the same control channel codeword to provide frequency diversity. This also allows effective link adaptation for distributed scheduled UEs.

f) If one MCS region ends while another continues, the RBs (or sub-carriers) of the latter can continue following the same pattern, leaving RBs (or sub-carriers) that would be occupied by the former for the data channel. Alternatively, they can change the pattern and occupy RBs (or sub-carriers) of the former so that Cat1 has a continuous structure (for a small loss in frequency diversity). This can be predetermined and each UE knows of the RBs (or sub-carriers) occupied by Cat1 (remaining SCCH) through Cat0.

g) Based at least on the reported CQI, the scheduler first determines the number of UEs whose SCCH transmission (not including Cat0) can achieve the desired codeword error rate target (e.g. 1%) with the highest MCS. Subsequently, the second highest MCS is considered, and so on until the SCCH of all UEs selected for scheduling is mapped onto a certain MCS.

h) If for any scheduled UEs, the SCCH transmission cannot achieve the desired target codeword error rate (at the lowest predetermined MCS region), the transmission may either still occur if it can achieve reasonably low error rate or scheduling of these UEs can be postponed for a later transmission time interval (TTI)-blocked transmission. The selection of the lowest MCS region should be such that blocked transmissions are very infrequent (e.g. 1% or less probability of a blocked transmission) and depends on the SINR distribution of UEs in the serving Node B.

i) The size of each MCS region may vary between consecutive TTIs depending on the number of UEs whose Cat1 (remaining SCCH) is transmitted in each MCS region.

j) Cat0 and the remaining SCCH are transmitted with priority to data at or near the beginning of a transmission time interval.

Convolutional or turbo coding is used for the control channel transmission depending on the codeword size in each MCS region as suggested in co-pending U.S. Application 60/746,450. If DL and UL control channel codewords (not including Cat0) that are transmitted in the same MCS region are jointly coded, convolutional coding may be used when the number (and total size) of these codewords is small. Turbo coding may be used otherwise. In the case of joint coding, each UE implicitly determines the coding type (convolutional or turbo) after decoding Cat0 and finding the number of DL and UL codewords in each MCS region.

The invention utilizes the estimate of the SINR that will be experienced by each transmission from the serving Node B to each DL or UL scheduled UE to code the control channel information (scheduling assignments) in the appropriate MCS region in order to ensure reception with a target error rate. In addition to the SINR, the MCS region depends on the transmitter and receiver antenna diversity, on the UE speed (as determined for example based on Doppler shift estimation at the serving Node B), and on the multi-path propagation conditions introduced by the channel medium to each transmitted control channel signal as they directly impact the achievable control channel codeword error rate for a given SINR value. For DL scheduled UEs, the SINR is determined from the CQI feedback these UEs provide to the serving Node B in order for the latter to schedule the transmission of data packets (by determining the MCS and the RBs used for the data transmission to a corresponding scheduled UE). For UL scheduled UEs, the SINR may be determined at the serving Node B through the transmission of a reference signal by each UL scheduled UE over the entire UL scheduling bandwidth for that UE.

Although the DL communication channel used for the control signaling (scheduling assignments) transmission and the UL communication channel used to obtain an SINR estimate for UL scheduled UEs may have different fading characteristics, the additional diversity provided by the possible multiple transmitter and receiver antennas and the frequency hopped transmission of the control channel introducing frequency diversity can effectively mitigate the impact of variations in the fading characteristics between the two communication channels. Moreover, as the multi-path propagation characteristics experienced by a given UE are typically the same in the DL and UL of a communication system, the Node B may use this information to provide additional protection to UEs experiencing low multi-path diversity by placing the corresponding UL control signaling information in a lower MCS region than indicated by the UL SINR measurement, thereby providing some performance margin.

Moreover, as unicast transmission (that is, dedicated communication between a serving Node B and a UE) may be TDM with multicast/broadcast transmission (that is, transmission of the same information from multiple Node Bs), DL unicast may not exist during certain TTIs while UL unicast may continue. For this reason, the control channel for unicast may still be transmitted in multicast/broadcast TTIs carrying only UL scheduling information, as suggested in U.S. Application 60/733,675. In such cases, Cat0 carries the aforementioned information only for UL scheduling assignments.

While several embodiments have been provided in the disclosure, it should be understood that the disclosed systems and methods may be embodied in many other specific forms without departing from the spirit or scope of the disclosure. The examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. In a communication system having at least one Node B serving a plurality of user equipments (UEs), a method to transmit control signaling information from said Node B to said UEs during a transmission time interval, wherein each control signal information is transmittable with a Modulation and Coding Scheme (MCS) in a predetermined set of MCS, said method comprising the steps of:

said Node B using a first MCS to transmit first control signaling information to a first UE in said plurality of UEs; and said Node B using a second MCS to transmit a second control signaling information to a second UE in said plurality of UEs, wherein said first UE and said second UE do not know said first MCS and said second MCS, respectively, and do not know the location of said first control signaling information and said second control signaling information, respectively, prior to decoding said first control signaling information and said second control signal information, respectively.

2. The method of claim 1, wherein said Node B transmits said first control signaling information to said first UE and said second control signaling information to said second UE with the same MCS by jointly coding said first control signaling information and said second control signaling information.

3. The method of claim 1, wherein the location of said first control signaling information transmitted with said first MCS to said first UE is determined based on the location of a resource for said first UE and said first MCS.

4. The method of claim 1, wherein said first said control signaling information conveys scheduling assignments to a UE for data transmission from said Node B to said UE and said second said control signaling information conveys scheduling assignments to same said UE for data transmission from said UE to said Node B, said first control signaling information and said second control signaling information being jointly coded to produce a joint control signaling information.

5. The method of claim 1, wherein said Node B determines said modulation and coding scheme to transmit said control channel information to at least one of said UEs based on a channel quality estimate obtained by said Node B from said at least one of said UEs.

6. The method of claim 5, wherein said channel quality estimate is explicitly transmitted from said at least one of said UEs to said Node B.

7. The method of claim 5, wherein said channel quality estimate is determined at said Node B based on a signal transmitted from said at least one of said UEs to said Node B.

8. The method of claim 1, wherein said Node B determines said modulation and coding scheme based on a target reception error rate of said control signaling information for at least one of said UEs and said Node B transmits said control signaling information with the modulation and coding scheme of the highest spectral efficiency satisfying said target reception error rate at said at least one of said UEs.

9. The method of claim 8, wherein said modulation and coding scheme of the highest spectral efficiency is from a predetermined set of multiple modulation and coding schemes.

10. The method of claim 1, wherein said Node B determines said modulation and coding scheme to transmit said control channel information based on the number of said Node B transmitter antennas.

11. The method of claim 1, wherein said Node B determines said modulation and coding scheme to transmit said control channel information to at least one of said UEs based on the number of receiver antennas for said at least one of said UEs.

12. The method of claim 1, wherein said Node B determines said modulation and coding scheme to transmit said control channel information to at least one of said UEs based on multi-path propagation characteristics introduced to the signal transmission by the channel medium.

13. The method of claim 12, wherein said Node B determines said multi-path propagation characteristics based on a signal transmitted by said at least one of said UEs to said Node B.

14. The method of claim 1, wherein said Node B determines said modulation and coding scheme to transmit said control channel information to at least one of said UEs based on an estimate for the velocity for said at least one of said UEs.

15. The method of claim 1, wherein said Node B transmits said first control channel information using frequency hopping.

16. The method of claim 1, wherein said Node B transmits said control channel information with priority to data.

17. The method of claim 1, wherein said communication system employs the OFDMA transmission method.

18. In a communication system having at least one Node B serving a plurality of user equipments (UEs), a method to transmit control signaling information from said Node B to said UEs during a transmission time interval comprising the steps of:

said Node B using one modulation and coding scheme to transmit said control signaling information to at least a first UE in said plurality of UEs;

said Node B using a second modulation and coding scheme, which is different than said first modulation and coding scheme, to transmit said control signaling information to at least a second UE in said plurality of UEs, which is different than said first UE of said plurality of UEs; and wherein said Node B transmits a first said control signaling information to a first UE and a second said control signaling information to a second UE with the same said modulation and coding scheme by jointly coding said first control signaling information and second said control signaling information to produce a joint control signaling information.

19. The method of claim 18, wherein said Node B transmits said joint control signaling information using a first coding scheme for a first size of said joint control signaling information and using a second coding scheme for a second size of said joint control signaling information.

20. The method of claim 19, wherein said first coding scheme is convolutional coding and said second coding scheme is turbo coding.

21. In a communication system having at least one Node B serving a plurality of user equipments (UEs), a method to transmit control signaling information from said Node B to said UEs during a transmission time interval comprising the steps of:

said Node B using one modulation and coding scheme to transmit said control signaling information to at least a first UE in said plurality of UEs;

said Node B using a second modulation and coding scheme, which is different than said first modulation and coding scheme, to transmit said control signaling information to at least a second UE in said plurality of UEs, which is different than said first UE of said plurality of UEs;

wherein a first said control signaling information conveys scheduling assignments to a UE for data transmission from said Node B to said UE and a second said control signaling information conveys scheduling assignments to same said UE for data transmission from said UE to said Node B, said first control signaling information and said second control signaling information being jointly coded to produce a joint control signaling information; and wherein said Node B transmits said joint control signaling information using a first coding scheme for a first size of said joint control signaling information and using a second coding scheme for a second size of said joint control signaling information.

22. The method of claim 21, wherein said first coding scheme is convolutional coding and said second coding scheme is turbo coding.

23. In a communication system having at least one Node B serving a plurality of user equipments (UEs). a method to transmit control signaling information from said Node B to said UEs during a transmission time interval comprising the steps of:

said Node B using one modulation and coding scheme to transmit said control signaling information to at least a first UE in said plurality of UEs; and said Node B using a second modulation and coding scheme, which is different than said first modulation and coding scheme, to transmit said control signaling information to at least a second UE in said plurality of UEs, which is different than said first UE of said plurality of UEs; and wherein the location of said control signaling information transmitted with a said modulation and coding scheme is determined based on the location of a reserved resource and the order of said modulation and coding scheme in a set of multiple modulation and coding schemes.

* * * * *